(12) United States Patent
Kang et al.

(10) Patent No.: US 8,463,503 B2
(45) Date of Patent: Jun. 11, 2013

(54) IMPACT SIGNAL PROCESSOR FOR FRONT IMPACT ACCELERATION SENSOR

(75) Inventors: Suk Chang Kang, Gyeongsangbuk-do (KR); Sei-Bum Choi, Daejeon (KR); Kwang Hyun Cho, Daejeon (KR)

(73) Assignees: Hyundai Motor Company, Seoul (KR); KAIST

(*) Notice: Subject to any disclaimer, the term of this patent is extended or adjusted under 35 U.S.C. 154(b) by 370 days.

(21) Appl. No.: 12/817,698

(22) Filed: Jun. 17, 2010

(65) Prior Publication Data

US 2011/0082617 A1 Apr. 7, 2011

(30) Foreign Application Priority Data

Oct. 7, 2009 (KR) ........................ 10-2009-0095111

(51) Int. Cl.
*B60R 21/0136* (2006.01)

(52) U.S. Cl.
USPC ............................................. 701/46; 701/45

(58) Field of Classification Search
USPC ...................... 701/45, 46; 280/735
See application file for complete search history.

(56) References Cited

U.S. PATENT DOCUMENTS

| | | | |
|---|---|---|---|
| 4,038,876 A * | 8/1977 | Morris ........................ | 73/1.38 |
| 5,173,614 A * | 12/1992 | Woehrl et al. ................ | 307/10.1 |
| 5,436,838 A * | 7/1995 | Miyamori ...................... | 701/46 |
| 5,608,628 A * | 3/1997 | Drexler et al. ................. | 701/45 |
| 5,967,548 A * | 10/1999 | Kozyreff ....................... | 280/735 |
| 6,070,113 A * | 5/2000 | White et al. .................... | 701/45 |
| 6,167,335 A * | 12/2000 | Ide et al. ........................ | 701/45 |
| 6,256,564 B1 * | 7/2001 | Miyaguchi et al. ............. | 701/45 |
| 6,330,500 B1 * | 12/2001 | Moriyama et al. .............. | 701/45 |
| 6,426,567 B2 * | 7/2002 | Ugusa et al. .................. | 307/10.1 |
| 6,701,238 B2 * | 3/2004 | McConnell ..................... | 701/45 |
| 6,906,622 B2 * | 6/2005 | Kleinschmidt et al. ....... | 340/436 |
| 6,999,863 B2 * | 2/2006 | Neal et al. ...................... | 701/46 |
| 7,225,069 B2 * | 5/2007 | Stuetzler ......................... | 701/45 |
| 7,347,297 B2 * | 3/2008 | Ide et al. ....................... | 180/282 |
| 7,416,210 B2 * | 8/2008 | Roelleke ....................... | 280/735 |
| 7,565,229 B2 * | 7/2009 | Andres et al. ................. | 701/30.3 |
| 7,568,543 B2 * | 8/2009 | Gaukel et al. ................. | 180/271 |
| 7,587,266 B2 * | 9/2009 | Tsukamoto et al. ........... | 701/45 |

FOREIGN PATENT DOCUMENTS

| | | | |
|---|---|---|---|
| DE | 102004043594 | * | 3/2006 |
| DE | 102004057689 | * | 6/2006 |
| DE | 102008017354 | * | 11/2009 |
| JP | 05026902 A | * | 2/1993 |
| JP | 08-067231 A | | 3/1996 |
| JP | 08-278325 A | | 10/1996 |

(Continued)

OTHER PUBLICATIONS

JPO machine translation of JP 05-26902 A.*

*Primary Examiner* — James Trammell
*Assistant Examiner* — David Testardi
(74) *Attorney, Agent, or Firm* — Edwards Wildman Palmer LLP; Peter F. Corless (57) ABSTRACT

The present invention features an impact signal processor. In preferred aspects, the impact signal processor comprises a first speed signal detection unit detecting a first speed signal of a vehicle using acceleration sensor data provided from an ACU (Airbag Control Unit) sensor, a second speed signal detection unit detecting a second speed signal of the vehicle using acceleration sensor data provided from a FIS (Front Impact Sensor) sensor, a phase lead unit, and a front impact speed estimation unit.

7 Claims, 6 Drawing Sheets

FOREIGN PATENT DOCUMENTS

| | | |
|---|---|---|
| JP | 10-059118 A | 3/1998 |
| KR | 10-1998-0040137 | 3/1999 |
| KR | 10-0218779 | 6/1999 |
| KR | 10-2001-0112303 | 12/2001 |
| KR | 10-2003-0045097 A | 6/2003 |
| KR | 10-2005-0012298 | 2/2005 |
| KR | 10-2007-0022879 A | 2/2007 |
| KR | 10-2008-0112462 A | 12/2008 |

* cited by examiner

IMPACT SIGNAL PROCESSOR FOR FRONT IMPACT ACCELERATION SENSOR

CROSS-REFERENCE TO RELATED APPLICATION

This application claims under 35 U.S.C. §119(a) the benefit of Korean Patent Application No. 10-2009-0095111, filed on Oct. 7, 2009 in the Korean Intellectual Property Office, the disclosure of which is incorporated herein in its entirety by reference.

BACKGROUND OF THE INVENTION

1. Technical Field

The present invention relates, generally, to an impact signal processor for a front impact acceleration sensor, and more particularly to an impact signal processor for a front impact acceleration sensor which can reduce sensor noise and the influence of disturbances against an impact signal by filtering a signal from a front impact acceleration sensor using a signal from a vertical acceleration sensor built in an airbag controller.

2. Background Art

Typically, an airbag impact discrimination algorithm for operating an airbag when car impact occurs discriminates the existence/nonexistence of car impact based on a sensed signal from a vertical acceleration sensor built in an airbag control unit.

However, since actual car impact can be of various types, such as front impact, impact on an inclined surface, offset impact, impact into a center pole, or the like, such various types of impact cannot be discriminated by only the vertical acceleration sensor built in the airbag controller. Recently, front impact acceleration sensors have been additionally mounted on front parts of a vehicle, e.g. in the neighborhood of both headlights, and an airbag impact discrimination algorithm has been used to discriminate diverse types of impact using such sensors.

However, according to the impact discrimination algorithms currently used, although the vertical acceleration sensor built in the airbag control unit is given much weight, the data obtained from the front impact acceleration sensor is additionally used to discriminate the impact type. However, when the front impact occurs, the front impact acceleration sensor is first damaged or is greatly influenced by the external disturbance or noise, and thus the data obtained from the front impact acceleration sensor is not reliable without any separate signal process of the signal output from the front impact acceleration system.

Figure 1:
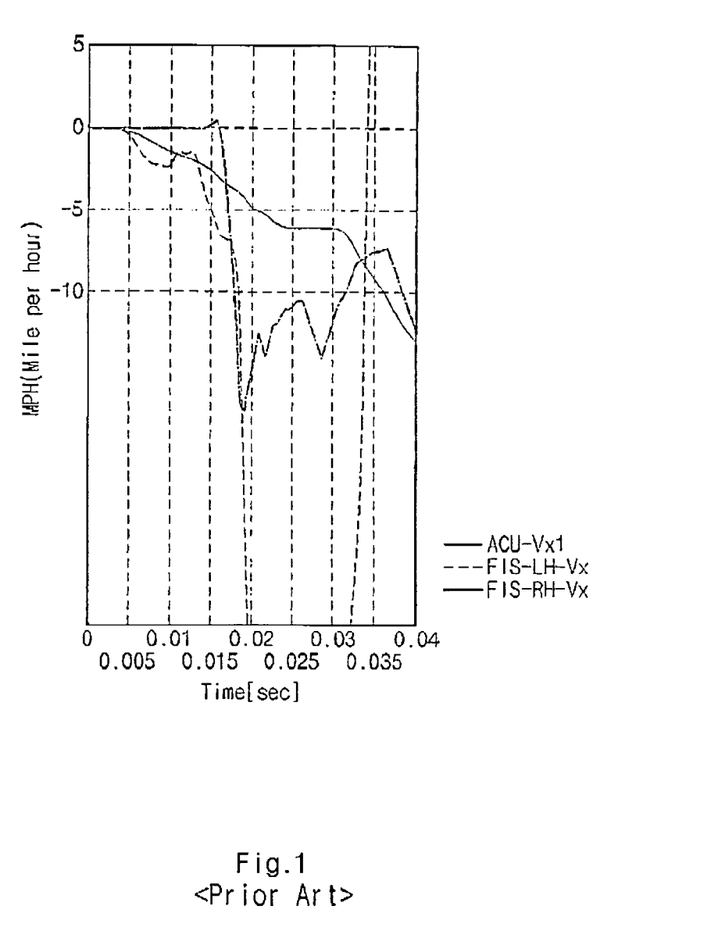
FIG. 1 is a graph showing a speed signal sensed though a vertical acceleration sensor built in an airbag control unit, a speed signal sensed through a left-side front impact acceleration sensor, and a speed signal sensed through a right-side front impact acceleration sensor when an actual front impact of a vehicle occurs.

FIG. 1 is a graph showing an exemplary speed signal ACU-Vx1 sensed though the vertical acceleration sensor built in the airbag control unit, a speed signal FIS-LH-Vx sensed through the left-side front impact acceleration sensor, and the speed signal FIS-RH-Vx sensed through the right-side front impact acceleration sensor when the actual front impact of a vehicle occurs.

When the front impact occurs, the two FIS signals, which are the same type, should exist below ACU-Vx1. However, since the right-side front impact acceleration sensor is damaged and is not in a normal operation state, as shown in FIG. 1, FIS-RH-Vx maintains the value of "0" for a predetermined time just after the impact, and then its slope is abruptly changed.

Accordingly, since there is a very high possibility that the front impact acceleration sensor is damaged by the vehicle impact or other external causes, it may be difficult to normally judge the impact if the signal output from the front impact acceleration sensor is used as it is.

Accordingly, in order to judge the impact type of the vehicle more accurately, a method capable of securing the reliability of data provided from the front impact acceleration sensors is needed in the art.

The above information disclosed in this the Background section is only for enhancement of understanding of the background of the invention and therefore it may contain information that does not form the prior art that is already known in this country to a person of ordinary skill in the art.

SUMMARY OF THE INVENTION

Accordingly, in preferred aspects, the present invention provides an impact signal processor for a front impact acceleration sensor which can secure the reliability of data provided from a front impact acceleration sensor, and thus can make an airbag impact discrimination algorithm discriminate an impact type of a vehicle more accurately and rapidly.

In preferred embodiments, is the present invention preferably provides an impact signal processor, which includes a first speed signal detection unit suitably detecting a first speed signal of a vehicle using acceleration sensor data provided from an ACU (Airbag Control Unit) sensor; a second speed signal detection unit suitably detecting a second speed signal of the vehicle using acceleration sensor data provided from a FIS (Front Impact Sensor) sensor; a phase lead unit leading a phase of the first speed signal, and suitably generating an upper threshold value and a lower threshold value that are changed to correspond to the first speed signal of which the phase has been read; and a front impact speed estimation unit suitably estimating a front impact speed of the vehicle by processing the second speed signal using the upper threshold value and the lower threshold value.

As described herein, according to the impact signal processor as described in preferred embodiments of the present invention, an impact type of the vehicle can be suitably discriminated more accurately and rapidly by estimating the speed that is expected when the FIS sensor is in a normal state using data provided from the ACU sensor having a high reliability.

In the impact signal processor according to another preferred embodiment of the present invention, the first speed signal detection unit and the second speed signal detection unit may suitably detect the first speed signal and the second speed signal by integrating the received acceleration sensor data, respectively.

Preferably, in the impact signal processor according to an exemplary embodiment of the present invention, the phase lead unit may lead the phase of the first speed signal as much as a phase difference between the first speed signal and the second speed signal according to the phase difference between the ACU sensor and the FIS sensor, and a phase lead value $\hat{F}$ of the phase lead unit may preferably be calculated by the following equation.

$$\hat{F}_x = k\frac{s+a_z}{s+a_p}A_x = \frac{a_p}{a_z}\frac{s+a_z}{s+a_p}A_x$$

$$a_p = a_1 v + b_1$$

$$a_z = a_2 v + b_2$$

Preferably, $A_x$ is an acceleration value provided from the ACU sensor according to an amount of impact, $a_p$ is a pole value, $a_z$ is a zero value, k is a gain value, v is a relative speed to a vehicle ahead, and $a_1$, $a_2$, $b_1$, and $b_2$ are parameters obtained through impact test data.

In the impact signal processor according to another further preferred embodiment of the present invention, the phase lead unit may suitably generate the upper threshold value and the lower threshold value by adjusting sizes of the parameters $a_1$, $a_2$, $b_1$, and $b_2$, so that the upper threshold value and the lower threshold value can be automatically changed to correspond to a change of the first speed signal.

In the impact signal processor according to preferred embodiments of the present invention as described herein, the front impact speed estimation unit matches a portion of the second speed signal having a speed value larger than the upper threshold value to the upper threshold value, suitably receives a portion of the second speed signal having a speed value between the upper threshold value and the lower threshold value as it is, and suitably matches a portion of the second speed signal having a speed value smaller than the lower threshold value to the lower threshold value.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other objects, features and advantages of the present invention will be more apparent from the following detailed description taken in conjunction with the accompanying drawings, in which.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION OF THE PREFERRED EMBODIMENTS

In a first aspect, the present invention features
Hereinafter, preferred embodiments of the present invention will be described in greater detail with reference to the accompanying drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail. In the following description, the same reference numerals are used for the same elements even in different drawings.

Figure 2:
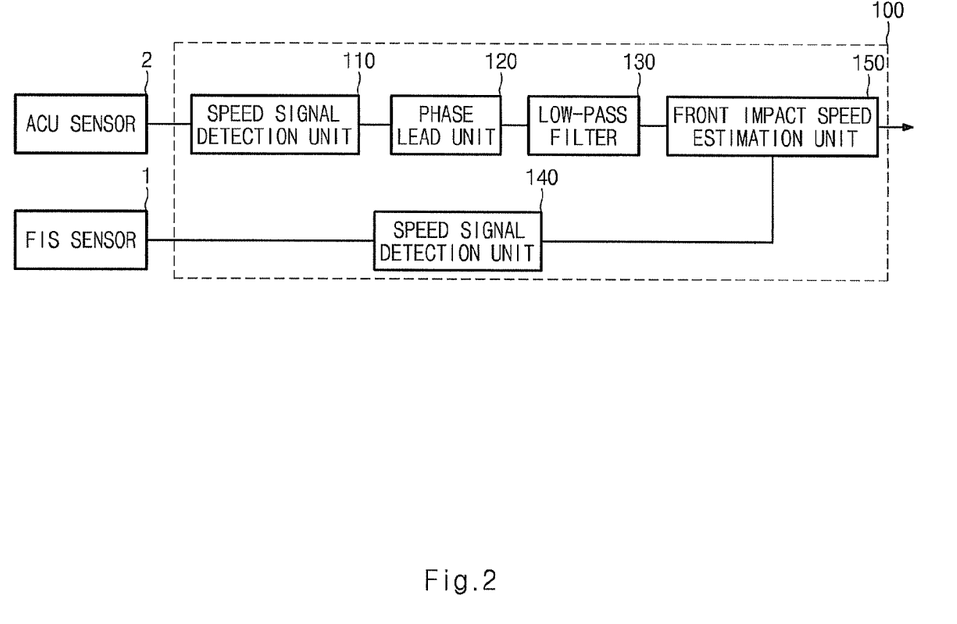
FIG. 2 is a block diagram illustrating the configuration of an impact signal processor according to an embodiment of the present invention.

FIG. 2 is a block diagram illustrating the configuration of an impact signal processor according to an exemplary embodiment of the present invention.

Preferably, an impact signal processor 100 includes speed signal detection units 110 and 140, a phase lead unit 120, a low-pass filter 130, and a front impact speed estimation unit 150.

According to certain exemplary embodiments, the speed signal detection unit 110 detects a signal (i.e. a first speed signal) of an impact speed of a vehicle acquired through a vertical acceleration sensor built in an airbag control unit (hereinafter referred to as an "ACU sensor") 2 by suitably integrating acceleration data sensed by the ACU sensor 2. Preferably, the speed signal detection unit 110 time-integrates the negative acceleration (−G) value in a vehicle traveling direction sensed by the ACU sensor 2 when the vehicle impact occurs, and outputs a speed signal that suitably indicates the speed value in the vehicle traveling direction. In a preferred embodiment of the present invention, since a speed signal shows more distinct features than an acceleration signal, the acceleration signal is suitably converted into the speed signal instead of directly using the acceleration signal, and the signal process is suitably performed using the converted speed signal.

Figure 3:
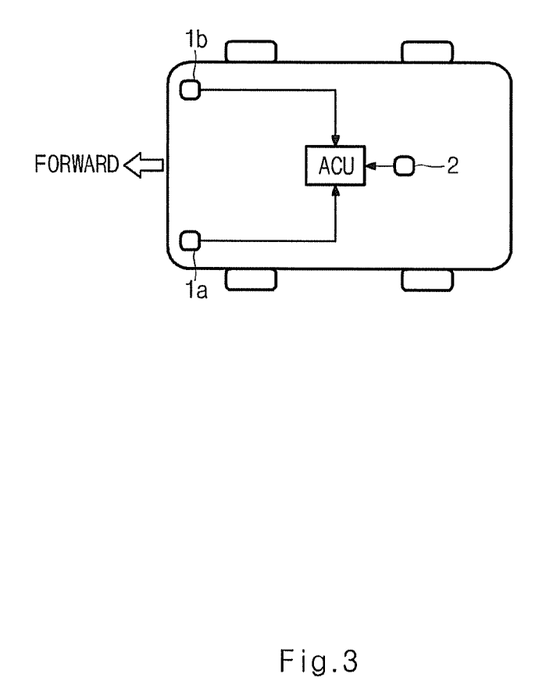
FIG. 3 is a view showing installed positions of an ACU sensor and FIS sensors.

According to preferred embodiments of the present invention, the phase lead unit 120 suitably compensates for a phase difference between the first signal and the speed signal (i.e. a second speed signal) for a front impact acceleration sensor (hereinafter referred to as a "FIS sensor") 1, which is output from a speed signal detection unit 14, by leading the phase of the first speed signal. Accordingly, in further preferred embodiments, for example as shown in FIG. 3, FIS sensors 1a and 1b are suitably installed in front parts of the vehicle, whereas the ACU sensors 2a and 2b are installed in the airbag control unit that is in the center part of the vehicle. Accordingly, in further preferred embodiments, when the front impact of the vehicle occurs, the signal provided from the FIS sensors 1a and 1b are suitably received in the airbag control unit prior to the signal from the ACU sensors 2a and 2b. Accordingly, a phase difference occurs between the first speed signal and the second speed signal, and the phase lead unit 120 leads the phase of the first speed signal to compensate for such a phase difference.

Equation (1) below shows transfer function for calculating a phase lead value $\hat{F}$ of the phase lead unit 120.

$$\hat{F}_x = k\frac{s + a_z}{s + a_p}A_x = \frac{a_p}{a_z}\frac{s + a_z}{s + a_p}A_x \qquad (1)$$

$$a_p = a_1 v + b_1$$

$$a_z = a_2 v + b_2$$

Preferably, $A_x$ is an acceleration value provided from the ACU sensor 2 according to an amount of impact, $a_p$ is a pole value, $a_z$ is a zero value, k is a gain value, v is a relative speed to a vehicle ahead when the impact occurs, and $a_1$, $a_2$, $b_1$, and $b_2$ are parameters which are obtained by combining impact test data obtained through vehicle impact tests made before delivery of the vehicle.

In further preferred embodiments, the phase lead unit 120 generates and outputs an upper threshold value and a lower threshold value for estimating the second speed signal using the led first speed signal. Preferably, the upper threshold value and the lower threshold value can be suitably obtained by properly changing the parameters that determine the pole value and the zero value in Equation (1). Accordingly, the parameters for determining the respective threshold values may be suitably determined so that most proper threshold values can be determined using the test data in the case where the FIS sensors 1 normally operates through several times impact test.

Preferably, the low-pass filter 130 removes a noise component from an output signal of the phase lead unit 120 by passing therethrough only low-band frequency components of the output signal of the phase lead unit 120.

According to preferred embodiments of the present invention, the speed signal detection unit 140 detects the signal (i.e. the second speed signal) for the impact signal of the vehicle acquired through the FIS sensors 1 by integrating the acceleration data sensed by the FIS sensors 1. Preferably, the speed signal detection unit 140 time-integrates the negative acceleration (–G) value in a vehicle traveling direction sensed by the FIS sensor 1 when the vehicle impact occurs, and outputs a pulse signal that suitably indicates the speed value in the vehicle traveling direction.

According to other further preferred embodiments, the front impact speed estimation unit 150 suitably estimates the front impact speed that can be acquired through the FIS sensors 1 using the second speed signal, the upper threshold value, and the lower threshold value. Accordingly, as described above, if the FIS sensor 1 is damaged simultaneously with the impact or has already been damaged before the impact, the second speed signal is output in an abnormal state. Accordingly, the front impact speed estimation unit 150 estimates the front impact speed that is expected when the FIS sensor 1 is normally operated by processing the second speed signal using the upper threshold value and the lower threshold value. Accordingly, in further preferred embodiments, the front impact speed estimation unit 150 suitably receives the signal in a range between the upper threshold value and the lower threshold value among the second speed signal output from the speed signal detection unit 140 as it is. In contrast, with respect to the signals which deviate from the range between the upper threshold value and the lower threshold value, the front impact speed estimation unit 150 matches the levels of the signals to the upper threshold value or the lower threshold value, respectively.

Figure 4:
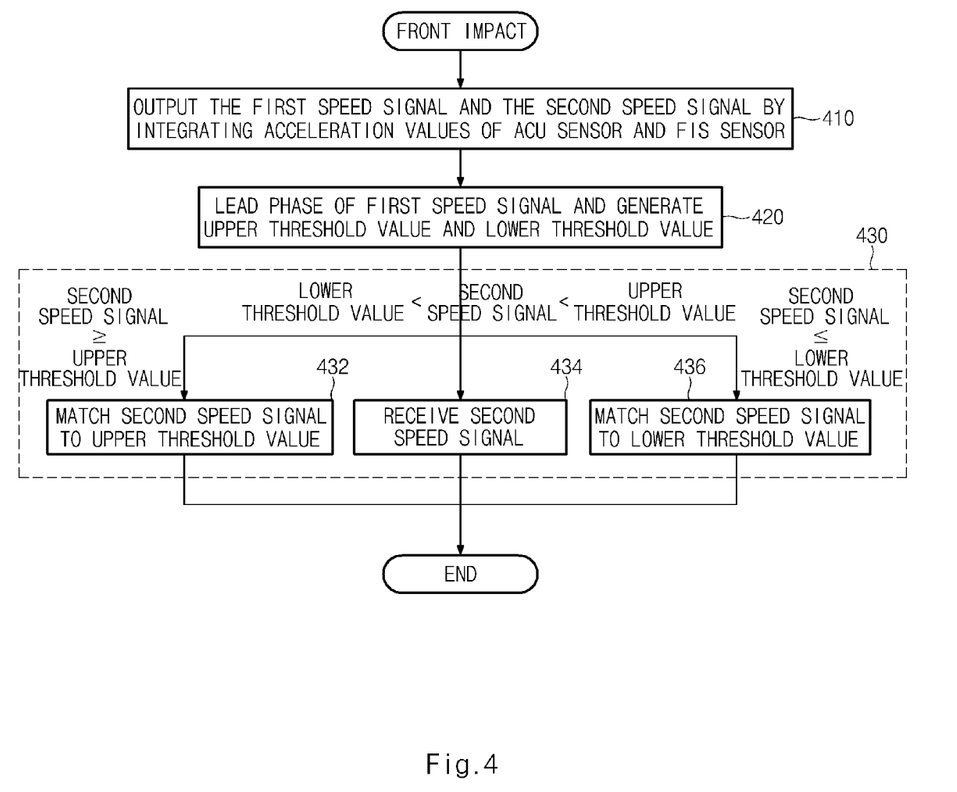
FIG. 4 is a flowchart illustrating an impact signal processing method in an impact signal processor having the above-described configuration according to an embodiment of the present invention.

According to further preferred embodiments of the present invention and as shown in FIG. 4, for example, FIG. 4 is a flowchart illustrating an impact signal processing method in an impact signal processor having the above-described configuration.

For example, if a front impact occurs in the vehicle in which a FIS sensor 1 and an ACU sensor 2 are mounted, the FIS sensor 1 first senses the negative acceleration (–G) value in a vehicle traveling direction according to the impact, and outputs the sensed value to the speed signal detection unit 140. Then, the ACU sensor 2 senses the negative acceleration (–G) value in the vehicle traveling direction according to the impact, and outputs the sensed value to the speed signal detection unit 110. Preferably, the speed signal detection units 110 and 140 time-integrates the acceleration data received from the ACU sensor 2 and the FIS sensor 1, and outputs the first speed signal and the second speed signal, which indicate the speed values in the vehicle traveling direction in the form as shown in FIG. 1 (step 410).

According to further preferred embodiments of the present invention and as shown in FIG. 1, for example, in FIG. 1, the first signal obtained by time-integrating the acceleration data from the ACU sensor 2 is indicated by a fine solid line, and the second speed signal obtained by time-integrating the left-side FIS sensor 1a and the right-side FIS sensor 1b is indicated by a fine dotted line and a dashed line.

Accordingly, due to a difference in position between the FIS sensor 1 and the ACU sensor 2, the phase of the first speed signal lags behind the phase of the second speed signal.

Accordingly, in further preferred embodiments, the phase lead unit 120 leads the phase of the first speed signal as much as the lag using the function value of Equation (1). Simultaneously, in further exemplary embodiments, the phase lead unit 120 suitably generates the upper threshold value and the lower threshold value using preset parameters $a_3$ to $a_6$, and $b_3$ to $b_6$ which are different from the parameters and $a_1$, $a_2$, $b_1$, and $b_2$ for leading the phase of the first speed signal as shown in Equation (1) (step 420).

For example, $a_3$, $a_4$, $b_3$, and $b_4$ may be used as suitable parameters for the pole value and the zero value for the upper threshold value, and $a_5$, $a_6$, $b_5$ and $b_6$ may be used as parameters for the pole value and the zero value for the lower threshold value.

In this case, for example, the parameters may be suitably determined using impact test data that is acquired through vehicle impact test performed before the delivery of the vehicle. At this time, the parameters for the respective threshold values may be suitably changed according to the intention of the vehicle designer through reflection of the kind of FIS sensor, the kind of vehicle, and the like.

Figure 5:
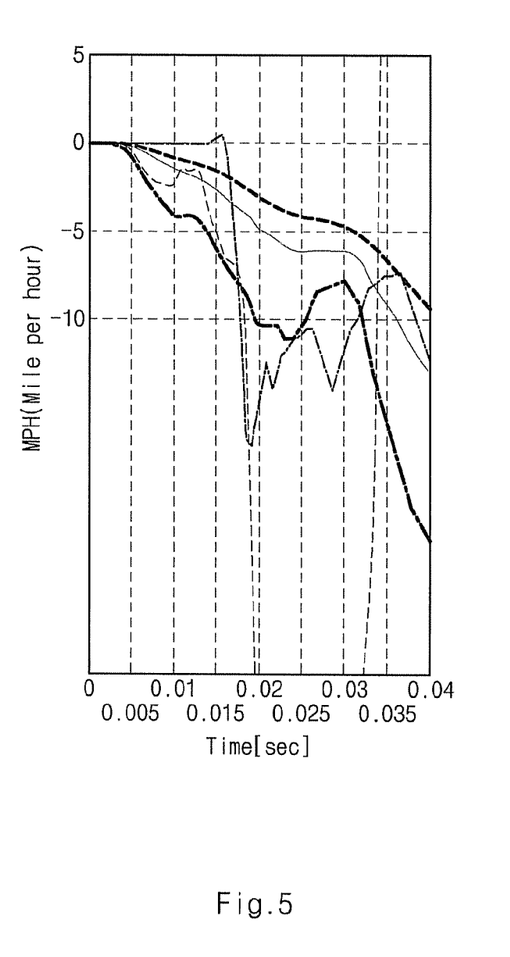
FIG. 5 is a graph in which an upper threshold value and a lower threshold value are added to the graph of FIG. 1.

According to further preferred embodiments of the present invention and as shown in FIG. 5, for example, FIG. 5 is a graph in which an upper threshold value and a lower threshold value are additionally indicated in the graph of FIG. 1. The bold dotted line indicates the upper threshold value, and the bold dashed line indicates the lower threshold value.

In preferred exemplary embodiments of the present invention, by changing only the parameters in the state where the same function is used in determining the threshold values and the first speed signal, the upper threshold value and the lower threshold value are preferably changed together with the first speed signal according to the relative speed.

Preferably, the first speed signal led by the phase lead unit 120 and the upper and lower threshold values passes through the low-pass filter 130 to remove the noise, and then is suitably applied to the front impact speed estimation unit 150.

According to further preferred embodiments of the present invention, the front impact speed estimation unit 150 suitably estimates the front impact speed of the vehicle by comparing the second speed signal applied from the speed signal detection unit 140 with the upper threshold value and the lower threshold value (step 430). That is, the front impact speed estimation unit 150 estimates the front impact speed of the vehicle expected when the FIS sensor 1 is normally operated by processing the second speed signal using the upper threshold value and the lower threshold value.

Accordingly, in further preferred exemplary embodiments, the front impact speed estimation unit 150 matches the portion of the second speed signal having a speed value larger than the upper threshold value to the upper threshold value (step 432), suitably receives the portion of the second speed signal having a speed value between the upper threshold value and the lower threshold value as it is (step 434), and suitably matches the portion of the second speed signal having a speed value smaller than the lower threshold value to the lower threshold value (step 436). Accordingly, a filtering work of the second speed signal using the upper threshold value and the lower threshold value is suitably performed.

Figure 6:
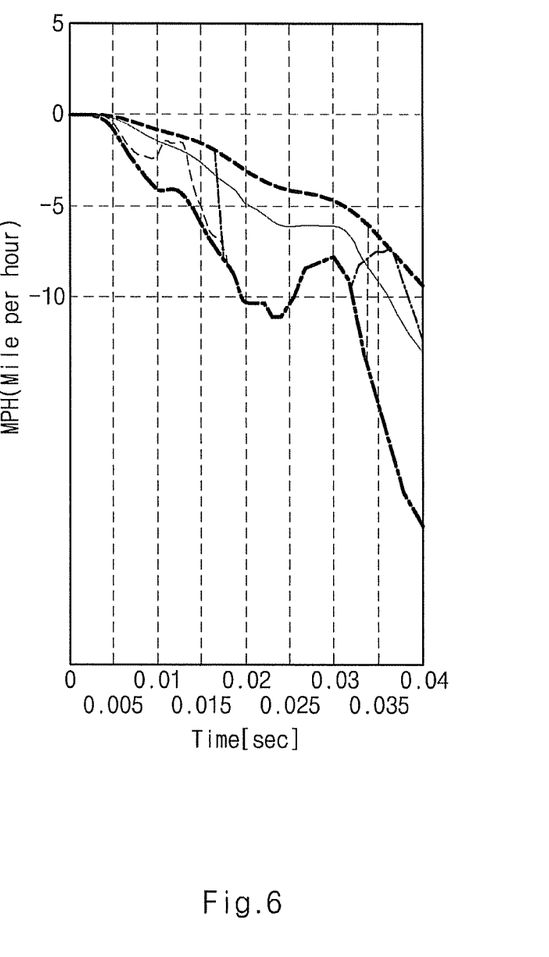
FIG. 6 is a graph showing the second speed signal of FIG. 5 that is estimated according to the signal processing method according to an embodiment of the present invention.

According to further preferred embodiments of the present invention and as shown in FIG. 6, for example, FIG. 6 is a graph showing the second speed signal of FIG. 5 that is estimated according to the signal processing method according to an embodiment of the present invention.

Preferably, through the estimation work using the upper threshold value and the lower threshold value as described above, a signal similar to the speed signal that is suitably obtained when the FIS sensor 1 is normally operated can be obtained.

Preferably, the speed signal estimated as above is used in an airbag impact discrimination unit, and thus the impact type can be suitably discriminated more accurately and rapidly.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An impact signal processor comprising:
   a first speed signal detection unit configured to detect a first speed signal of a vehicle using acceleration sensor data provided from an ACU (Airbag Control Unit) sensor;
   a second speed signal detection unit configured to detect a second speed signal of the vehicle using acceleration sensor data provided from a FIS (Front Impact Sensor) sensor;
   a phase lead unit configured to lead a phase of the first speed signal, and generating an upper threshold value and a lower threshold value that are changed to correspond to the first speed signal of which the phase has been led; and
   a front impact speed estimation unit configured to estimate a front impact speed of the vehicle by processing the second speed signal using the upper threshold value and the lower threshold value.

2. The impact signal processor of claim 1, wherein the first speed signal detection unit and the second speed signal detection unit are configured to detect the first speed signal and the second speed signal by integrating the received acceleration sensor data, respectively.

3. The impact signal processor of claim 1, wherein the phase lead unit is configured to lead the phase of the first speed signal by as much as a phase difference between the first speed signal and the second speed signal.

4. The impact signal processor of claim 3, wherein a phase lead value $\hat{F}$ of the phase lead unit is calculated by the following equation, $$\hat{F}_x = k\frac{s + a_z}{s + a_p}A_x = \frac{a_p}{a_z}\frac{s + a_z}{s + a_p}A_x$$

$$a_p = a_1 v + b_1$$

$$a_z = a_2 v + b_2$$

where, $A_x$ is an acceleration value provided from the ACU sensor according to an amount of impact, $a_p$ is a pole value, $a_z$ is a zero value, k is a gain value, v is impact speed, and $a_1$, $a_2$, $b_1$, and $b_2$ are parameters obtained through impact test data.

5. The impact signal processor of claim 4, wherein the phase lead unit is configured to generate the upper threshold value and the lower threshold value by adjusting sizes of the parameters in the function.

6. The impact signal processor of claim 1, wherein the front impact speed estimation unit is configured to filter the second speed signal using the upper threshold value and the lower threshold value.

7. The impact signal processor of claim 1, wherein the front impact speed estimation unit is configured to match a portion of the second speed signal having a speed value larger than the upper threshold value to the upper threshold value, receives a portion of the second speed signal having a speed value between the upper threshold value and the lower threshold value as it is, and matches a portion of the second speed signal having a speed value smaller than the lower threshold value to the lower threshold value.

* * * * *